United States Patent
Shorty et al.

(10) Patent No.: US 11,375,463 B2
(45) Date of Patent: Jun. 28, 2022

(54) SYSTEM, APPARATUS AND METHOD FOR DYNAMIC TRANSMIT POWER DETERMINATION

(71) Applicant: Silicon Laboratories Inc., Austin, TX (US)

(72) Inventors: Peter Shorty, Valby (DK); Lucas Balling, Copenhagen (DK)

(73) Assignee: Silicon Laboratories Inc., Austin, TX (US)

( * ) Notice: Subject to any disclaimer, the term of this patent is extended or adjusted under 35 U.S.C. 154(b) by 80 days.

(21) Appl. No.: 17/106,368

(22) Filed: Nov. 30, 2020

(65) Prior Publication Data

US 2022/0174617 A1    Jun. 2, 2022

(51) Int. Cl.
*H04W 52/54* (2009.01)
*G06N 20/00* (2019.01)
*H04W 52/24* (2009.01)

(52) U.S. Cl.
CPC ............ *H04W 52/54* (2013.01); *G06N 20/00* (2019.01); *H04W 52/245* (2013.01)

(58) Field of Classification Search
CPC ..... H04W 52/54; H04W 52/245; G06N 20/20
USPC .................................................. 455/522, 69
See application file for complete search history.

(56) References Cited

U.S. PATENT DOCUMENTS

| | | | | |
|---|---|---|---|---|
| 6,385,183 B1 * | 5/2002 | Takeo | ................ | H04W 52/346 370/320 |
| 8,364,141 B1 * | 1/2013 | Kateley | ................ | H04W 24/02 370/242 |
| 9,204,319 B2 * | 12/2015 | Ouyang | ................ | H04W 24/02 |
| 9,439,081 B1 * | 9/2016 | Knebl | ................... | G06N 20/00 |
| 9,888,337 B1 * | 2/2018 | Zalewski | .............. | H02N 11/002 |
| 9,894,471 B1 * | 2/2018 | Zalewski | ................ | H04W 4/70 |
| 9,900,790 B1 * | 2/2018 | Sheen | ................... | H04L 41/147 |
| 9,911,290 B1 * | 3/2018 | Zalewski | ........... | G06Q 30/0633 |
| 10,038,992 B1 * | 7/2018 | Zalewski | ........... | G06Q 30/0635 |
| 10,142,822 B1 * | 11/2018 | Zalewski | ................ | H04L 67/10 |
| 10,187,773 B1 * | 1/2019 | Zalewski | ................ | H04W 4/70 |
| 10,355,730 B1 * | 7/2019 | Zalewski | ................ | H04L 67/10 |
| 10,423,978 B2 * | 9/2019 | Huang | ............... | G06Q 30/0269 |
| 10,477,426 B1 * | 11/2019 | Tiwari | ................ | H04L 43/0852 |
| 10,693,937 B2 * | 6/2020 | Rácz | ..................... | H04W 24/08 |
| 10,779,183 B2 * | 9/2020 | Li | ........................... | H04L 65/80 |
| 10,985,617 B1 * | 4/2021 | Johnston | ............... | H02J 50/005 |

(Continued)

OTHER PUBLICATIONS

Naomi Ramos, et al., "A Device and Network-Aware Scaling Framework for Efficient Delivery of Scalable Video Over Wireless Networks," The 18th Annual IEEE International Symposium on Personal, Indoor and Mobile Radio Communications (PIMRC'07), 2007, 5 pages total.

(Continued)

*Primary Examiner* — Hai V Nguyen
(74) *Attorney, Agent, or Firm* — Trop, Pruner & Hu, P.C.

(57) ABSTRACT

In an embodiment, an apparatus includes a transceiver with a receiver signal processing path and a transmitter signal processing path. The receiver signal processing path is to receive and process a message. The apparatus further includes a controller coupled to the transceiver to obtain information regarding the message and to determine, based at least in part on the information, a transmit power level for a next message to be sent from the transceiver according to a machine learning model.

20 Claims, 4 Drawing Sheets

(56) References Cited

U.S. PATENT DOCUMENTS

| | | | | |
|---|---|---|---|---|
| 10,991,242 B2* | 4/2021 | Taylor | | H04Q 9/00 |
| 11,139,699 B2* | 10/2021 | Johnston | | H02J 50/60 |
| 11,141,116 B2* | 10/2021 | Cabrera, Jr. | | G16H 15/00 |
| 11,154,253 B2* | 10/2021 | Cabrera, Jr. | | G06F 3/0488 |
| 11,211,703 B2* | 12/2021 | Marr, Jr. | | H03F 3/68 |
| 11,259,191 B2* | 2/2022 | Chen | | G06N 3/02 |
| 11,288,933 B1* | 3/2022 | Zalewski | | G06Q 30/0633 |
| 11,290,977 B1* | 3/2022 | Chinnapalli | | H04B 7/0897 |
| 2012/0149412 A1* | 6/2012 | Nergis | | H04B 17/29 |
| | | | | 455/501 |
| 2015/0289149 A1* | 10/2015 | Ouyang | | H04W 16/18 |
| | | | | 370/252 |
| 2018/0042558 A1* | 2/2018 | Cabrera, Jr. | | G16H 40/67 |
| 2018/0042559 A1* | 2/2018 | Cabrera, Jr. | | A61B 5/743 |
| 2018/0046187 A1* | 2/2018 | Martirosyan | | B64D 47/08 |
| 2019/0180171 A1* | 6/2019 | Ott | | H04L 67/18 |
| 2019/0180386 A1* | 6/2019 | Gandhi | | G06F 16/29 |
| 2019/0312923 A1* | 10/2019 | Rácz | | H04W 24/08 |
| 2019/0341954 A1* | 11/2019 | Zalewski | | H04W 4/70 |
| 2019/0373495 A1* | 12/2019 | Ouyang | | H04W 16/28 |
| 2020/0027294 A1* | 1/2020 | Schat | | G07C 9/00309 |
| 2020/0029240 A1* | 1/2020 | Li | | H04L 43/08 |
| 2020/0169895 A1* | 5/2020 | Chen | | G06N 3/08 |
| 2020/0278738 A1* | 9/2020 | Madar, III | | G06N 3/063 |
| 2020/0319324 A1* | 10/2020 | Au | | G01S 7/006 |
| 2020/0351698 A1* | 11/2020 | Li | | H04L 43/08 |
| 2021/0091606 A1* | 3/2021 | Johnston | | H02J 50/60 |
| 2021/0099829 A1* | 4/2021 | Soto | | H04W 4/023 |
| 2021/0226481 A1* | 7/2021 | Chan | | H02J 50/402 |
| 2021/0242582 A1* | 8/2021 | Marr, Jr. | | G01S 7/032 |
| 2021/0294172 A1* | 9/2021 | Rasmus-Vorrath | | E06B 9/24 |
| 2021/0313841 A1* | 10/2021 | Johnston | | H02J 50/90 |
| 2021/0382972 A1* | 12/2021 | Littrell | | H04R 19/04 |
| 2021/0383824 A1* | 12/2021 | Condorelli | | H03G 3/342 |
| 2021/0398662 A1* | 12/2021 | Strom | | A61B 5/14546 |
| 2022/0000432 A1* | 1/2022 | Cabrera, Jr. | | G16H 40/67 |
| 2022/0067651 A1* | 3/2022 | Kawaguchi | | G06Q 10/0833 |

OTHER PUBLICATIONS

U.S. Appl. No. 16/916,202, filed Jul. 20, 2020, entitled, "Scaling Traffic in a User Aware Wireless Control Network," by Peter Shorty, et al.

Jian Xiao, et al., "An Efficient Transmission Power Control Algorithm in Wireless Sensor Networks," 2007, 4 pages total.

* cited by examiner

SYSTEM, APPARATUS AND METHOD FOR DYNAMIC TRANSMIT POWER DETERMINATION

BACKGROUND

Wireless control networks typically have a static transmit (TX) power level or use a simple static algorithm for choosing TX power for transmitting internal messages in the network. Typical wireless control networks normally have a range of approximately 100-200 meters. In this environment and with a static TX power level for present devices, there can be issues with interference between devices within the network or with nearby networks, which increase a co-existence problem. And when the TX power level is higher than actually required, increased power consumption can be detrimental to battery-operated devices.

SUMMARY OF THE INVENTION

In one aspect, an apparatus includes: a transceiver comprising a receiver signal processing path and a transmitter signal processing path, the receiver signal processing path to receive and process a message; and a controller coupled to the transceiver to obtain information regarding the message and to determine, based at least in part on the information, a transmit power level for a next message to be sent from the transceiver according to a machine learning (ML) model.

In an example, the controller is to receive the ML model from a network controller of a wireless control network, the ML model determined in the network controller based at least in part on network traffic information of the wireless control network. The controller may replace an original ML model stored in the apparatus with the received ML model. The apparatus may further comprise a storage to store the ML model.

In an example, the apparatus further includes a data processor to extract noise floor information and transmit power information from a header of the message, where the information includes this noise floor information and transmit power information. The apparatus may further include a signal detector coupled to the receiver signal processing path to determine received power information based on the message, where the information includes this received power information. The signal detector may comprise a received signal of strength indicator (RSSI) detector and the received power information comprises an RSSI value.

In an example, the transmitter signal processing path comprises a power amplifier to amplify and output the next message via an antenna, where the controller is to configure the power amplifier based on the transmit power level. The apparatus may insert a value of the transmit power level into a header of the next message. The apparatus may further insert a value of noise floor information into the header of the next message.

In another aspect, a method includes: monitoring, in a network controller, network traffic within a wireless control network; logging network traffic metadata regarding the network traffic; performing ML using the logged network traffic metadata to update a ML model for use by transmitters within the wireless control network; and sending the updated ML model to a plurality of nodes of the wireless control network, the plurality of nodes each including a transmitter.

In an example, the method further includes configuring the plurality of nodes of the wireless control network with a standard ML model, and thereafter monitoring the network traffic and logging the network traffic metadata. The method may further include extracting the network traffic metadata from a plurality of messages communicated within the wireless control network, the network traffic metadata comprising, for each of the plurality of messages, a noise floor value and a transmit power value from each of the plurality of messages. The method also may include determining a received power value for each of the plurality of messages. The updated ML model may be stored in a non-volatile storage associated with the controller, the controller comprising a gateway of the wireless control network.

In another aspect, a wireless device comprises: a front end circuit to receive and downconvert a radio frequency (RF) signal to a baseband signal; a demodulator coupled to the front end circuit to demodulate the baseband signal to obtain a message; a data processor coupled to the demodulator to receive the message and extract transmit power information and noise floor information from a header of the message; a controller coupled to the data processor to receive the transmit power information and the noise floor information, and to determine based at least in part thereon using a ML model, a transmit power level for a next message to be sent from the wireless device; and a power amplifier to amplify and output the next message according to the transmit power level.

In an example, the controller is to receive the ML model from a network controller of a wireless control network, the ML model determined in the network controller based at least in part on network traffic information of the wireless control network. The wireless device may further comprise a signal detector to determine received power information based on the message. The controller may receive the received power information, and determine the transmit power level for the next message further based on the received power information. The data processor may insert a value of the transmit power level for the next message into a header of the next message.

DETAILED DESCRIPTION

In various embodiments, a wireless control network such as a smart home network may include a plurality of devices, referred to herein as nodes, that may be configured to dynamically control their transmit power. This transmit power control may occur in a manner conducive for both reducing power consumption by using reduced transmit power levels in many cases and reducing interference as a result of the lower transmit power levels. To this end, nodes may be configured with control circuitry such as a microcontroller or other programmable control circuit that may be configured to dynamically determine a transmit power level on an individual message basis. In one example implementation, each message may take the form of a frame or packet communication. Of course other messages may take the form of a multi-frame or multi-packet communication.

In particular embodiments herein, a device or node, via its internal controller, may dynamically determine TX power according to a plurality of input parameters, details of which are described herein. To reduce the compute complexity, the controller may be configured to execute a neural network such as a machine learning (ML) model. This ML model may be provided from a central controller of the wireless control network.

In many implementations, an initial standard ML model may be provided to nodes when they are provisioned into the wireless control network. Then additional machine learning may be performed within the central controller or at a cloud-based location. Based at least in part on this additional machine learning, an updated ML model may be provided to the devices and used for future TX power determinations. In this way, nodes having a minimal compute complexity can leverage machine learning to dynamically determine optimal TX power levels in a low power and cost-effective manner.

In an embodiment the neural network or other ML model may be trained on generated data of a hostile wireless indoor environment. This training may be done using actual data of a wireless environment or by simulation. As an example this ML model can be generated, e.g., by one or more server computers such as cloud-based servers.

By training the ML model on such hostile wireless network having adverse conditions including multipath propagation and fading, no line of sight, reflections, shadow fading and interference from close networks, the resulting ML model may be suitable in all types of environments. As used herein, this baseline ML model may be referred to as a standard algorithm.

In an embodiment, the trained neural network implemented as this standard algorithm may use information associated with a frame to determine a TX power level for the node. In an embodiment, this information may include noise floor and TX power metadata as sent by a transmitter (e.g., in a header of the frame). In addition a power level (e.g., as determined using a received signal strength indicator (RSSI) value of the received frame) determined in a receiver of the node also may be used. Of course in other cases, additional or different parameters may be used.

This standard algorithm implemented in the ML model may be provisioned into one or more network controllers of a wireless control network. In an embodiment, this ML model may be stored in a non-volatile storage of the controller(s) during manufacture. In other cases, the ML model can be provisioned into the network controller when a wireless control network is established, e.g., via a download from a cloud-based server or other remote repository storing the standard algorithm.

Thus with embodiments, TX power can be dynamically controlled in network nodes in a manner that adapts to any wireless environment without increasing package error rate (PER), TX power or power consumption. As such using a neural network, embodiments address concerns as to high TX power, high power consumption, interference and co-existence problems with other networks.

A network controller such as a gateway that is AC mains powered and has a high computational power compared to end nodes (which may typically be battery-operated devices) can be used to perform a local update of a neural network. For this machine learning, the controller may sample data by monitoring and logging network traffic. After the controller has gathered sufficient data, it may perform machine learning on the gathered data to fit the standard algorithm to the environment in which the wireless control network is deployed. When the controller has found a better algorithm for the environment, it may store this updated algorithm in a non-volatile storage (e.g., replacing a present version of the algorithm) and pushing it to the nodes in the network. In this way, a custom TX power controller may be provided on a per wireless network basis, and used for optimal performance, low interference and low power consumption.

Figure 1:
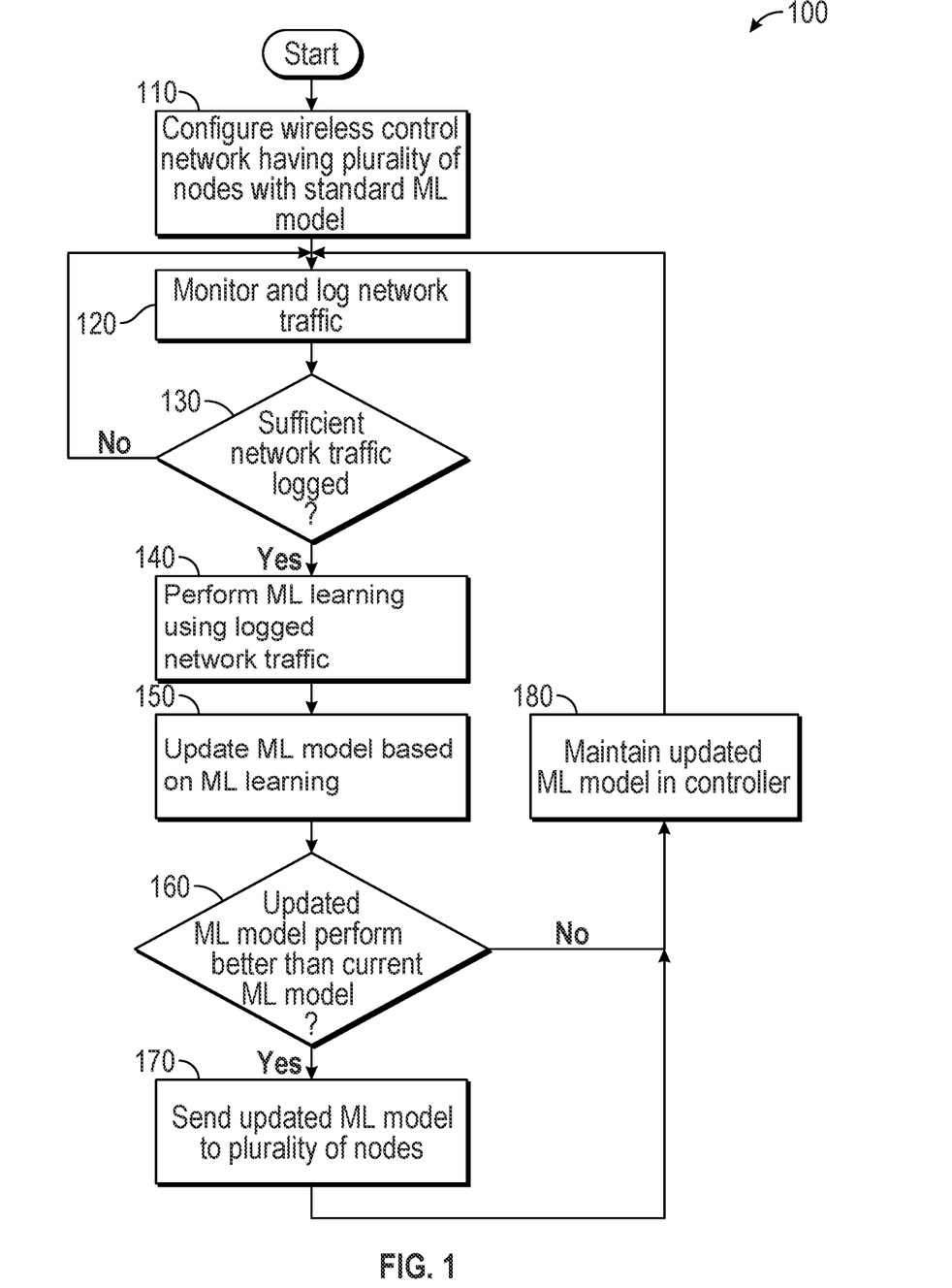
FIG. 1 is a flow diagram of a method in accordance with an embodiment.

Referring now to FIG. 1, shown is a flow diagram of a method in accordance with an embodiment. More specifically, method 100 of FIG. 1 is a method for configuring a wireless control network with a transmit power control mechanism as described herein, and updating the same. In an embodiment, method 100 may be performed at least in part using a controller of the wireless control network, such as a gateway device that is included in a wireless control network with a variety of different nodes. As such, method 100 may be performed by hardware circuitry alone and/or in combination with firmware and/or software.

As illustrated, method 100 begins by configuring the wireless control network with a standard ML model (block 110). This ML model, which may be present in the network controller (or in a non-volatile storage coupled thereto), can be provided to nodes within the network. Such communication of the ML model may be done on provisioning of nodes within the network. In an embodiment, the gateway itself may communicate configuration messages that include the ML model. Note that on an initial provisioning of a wireless control network, this ML model may be implemented as a standard algorithm, such as derived by a designer of the gateway, end node and/or wireless control network. As discussed, this standard algorithm may be trained in a hostile wireless network setting, to ensure that the algorithm works suitably in a variety of different actual network implementations.

After configuration operations are complete and nodes within the network begin communicating messages with transmit power levels determined using the ML model, control next passes to block 120 where the controller can monitor and log network traffic. More specifically in embodiments herein, the controller may receive messages from various nodes and log network traffic metadata regarding these messages including transmit power level information, noise floor information and received power level information. The controller may maintain this information, e.g., in a data log, which may be stored in a volatile or non-volatile memory of the controller.

Still referring to FIG. 1, next it is determined whether sufficient network traffic has been logged (diamond 130). Although embodiments are not limited in this regard as an example, this determination may be based on whether information of a threshold number of messages has been logged. In this example, this threshold number may be at least approximately 10,000 messages logged over a period of at least a month. If insufficient information is available, control passes back to block 120 for further monitoring and logging of network traffic.

Instead when it is determined that sufficient information is available, control passes to block 140 where the controller may perform machine learning (e.g., reinforcement learning) using the logged network traffic metadata. This is the case, as the controller may have sufficient compute complexity to perform additional training using the standard algorithm and this actual data from the network. Accordingly, based on this machine learning, the ML model may be updated at block 150. In some cases, this update may be effected by providing an entirely new ML model. In other cases, the same basic neural network may be used, with different weights for various layers of the network.

In an embodiment, the machine learning may be performed using a neural network that is implemented as an integer-based network without the use of a math library. In some cases, to reduce execution time one or more lookup tables may be used, e.g., with a separate table for each of noise floor, TX power and received power. Also, a tangent hyperbolic transfer function can be approximated to simplify this function. In an example, the network further may be optimized by scaling inputs to the network.

In some embodiments, a neural network may be implemented in a manner to support certain policies to reduce long jumps in TX power between different frames. To this end, these policies may: limit jumps to a given threshold level (e.g., 5 dB); if the received power information is less than a certain amount above the noise floor, no update to the TX power occurs; and if a message was not received by the receiver, increase TX power by a predetermined level. Of course additional or different policies may be present in other embodiments.

Still with reference to FIG. 1, after updating the ML model, it may be provided to the various nodes of the network in different manners. In some cases, a global broadcast may directly be sent out. In other cases, unicast messages can be sent to particular nodes, e.g., based on their activity levels or so forth. Note that in some cases, such as where a minimal update to the ML model was made, it can be determined (as shown at diamond 160) whether the updated ML model performs better (e.g., significantly better, such as by a threshold amount) than the current ML model as to one or more parameters of measure. When this is the case, control passes to block 170 where the updated model is sent to nodes of the network. If not, instead it may be maintained in the controller (block 180) to be used in connection with future updates, but not sent to the nodes for update. Of course in other implementations this determination may not be present and in response to an update to the ML model, the updated ML model may directly be sent to the various nodes. Understand while shown at this high level in the embodiment of FIG. 1, many variations and alternatives are possible.

Figure 2:
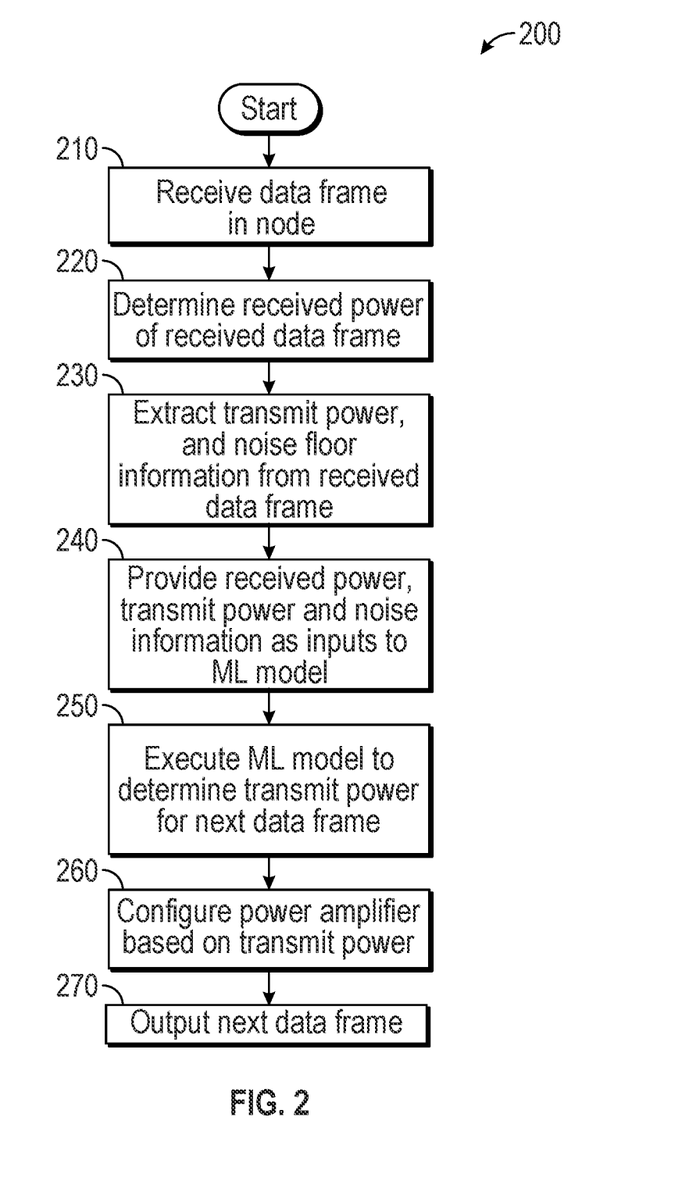
FIG. 2 is a flow diagram of another method in accordance with an embodiment.

Referring now to FIG. 2, shown is a flow diagram of another method in accordance with an embodiment. More specifically, method 200 of FIG. 2 is a method for dynamically determining a transmit power level for an outgoing message from a node of a wireless network. In an embodiment, method 200 may be performed at least in part using transceiver circuitry and a controller of the node. As such, method 200 may be performed by hardware circuitry alone and/or in combination with firmware and/or software.

As illustrated, method 200 begins by receiving a data frame in a node (block 210). Assume that this data frame is received from another node within the wireless control network. In an embodiment in which communication is according to a Z-Wave communication protocol available now or in the future, such as a Z-Wave Long Range protocol, this data frame may include header information in addition to payload information. More specifically, a frame in a Z-Wave communication protocol may be formed of a media access control (MAC) Protocol Data Unit (MPDU) that includes: an MPDU header (MHR), which may include address, frame control and length information (as will be described further); a MAC data payload; and a MAC footer (MFR), which contains a frame check sequence (FCS).

In an embodiment, the MHR may include various fields including a noise floor field to provide noise floor information. This field may be an 8 bit signed field that indicates the radio noise level measured on the channel the frame is transmitted on, e.g., as measured by a transmitter before sending a frame. More specifically, the noise floor may be a RSSI value in dBm measured as a running average when there is no Z-Wave long range traffic being received on the channel. The noise floor field may have the format of Table 1 in an embodiment.

TABLE 1

| Noise Level Values | Description |
| --- | --- |
| −120 . . . 30 | RSSI value in dBm |
| 127 | RSSI not available |
| −127 . . . −126 | Reserved |
| 30 . . . 126 | Reserved |

In an embodiment, the MHR may further include a TX power field that provides a level of the transmit power of the transmitting device. The TX power field may be a 8 bit signed field that specifies the transmit power used to transmit a frame, e.g., in terms of dBm and measured as output from a transmitter, not taking antenna gain/loss into account (in an embodiment).

TABLE 2

| TX Power Values | Description |
| --- | --- |
| −100 . . . 35 | TX power in dBm |
| −127 . . . −101 | Reserved |
| 36 . . . 127 | Reserved |

Still with reference to FIG. 2, at block 220 a received power for the received data frame may be determined. In an embodiment, this received power level may be determined in a signal detector of the node, which in an embodiment may be implemented as an RSSI detector. Next at block 230, circuitry of the node (e.g., data processing circuitry) may extract information from a header of the data frame, including transmit power information and noise floor information, such as described above with respect to Tables 1 and 2.

At block 240 this operating parameter information, namely the received power level, the transmit power and the noise floor information, may be provided as inputs to the ML model of the node, which as described above may be implemented within a controller of the node. As such, at block 250 the ML model may be executed to determine a transmit power level for a next data frame to be transmitted by the node.

Control next passes to block 260 where a power amplifier of the node can be configured based on this transmit power level. As one particular example, one or more slices of a multi-slice power amplifier can be enabled or disabled to achieve the desired transmit power level. Thus at block 270 a next data frame may be output at this dynamically determined TX power level. Understand while shown at this high level in the embodiment of FIG. 2, many variations and alternatives are possible.

Figure 3:
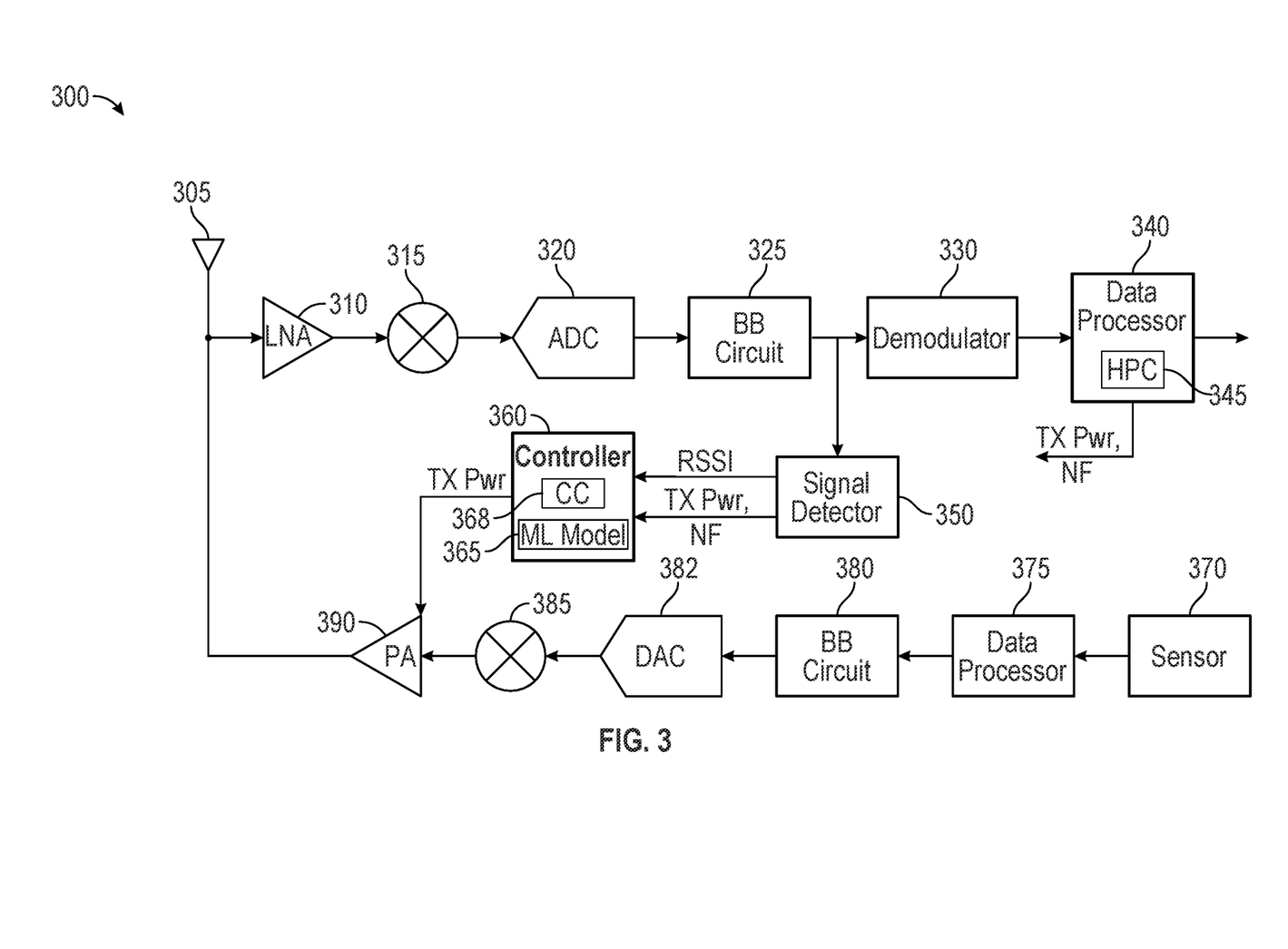
FIG. 3 is a block diagram of a wireless device accordance with an embodiment.

Referring now to FIG. 3, shown is a block diagram of a wireless device accordance with an embodiment. As illustrated, device 300 may be any type of wireless device including a given IoT device or other such end node device that may be present in a wireless control network. In the high level shown in FIG. 3, transceiver circuitry of device 300, along with additional circuitry is shown.

An antenna 305 may couple to both receiver and transmitter signal processing paths of device 300. In the receiver processing path, incoming RF signals are provided to front end circuitry including a low noise amplifier (LNA) 310 which may amplify the incoming RF signals. In turn, the RF signals are provided to a mixer 315, which downconverts the RF signals to a lower frequency such as a given intermediate frequency (IF) level, baseband or so forth, by way of mixing the RF signal with a mixing signal (not shown for ease of illustration in FIG. 3).

The resulting downconverted signals are digitized in an analog-to-digital converter (ADC) 320 and in turn are provided to a baseband circuit 325, which may perform various baseband signal processing such as filtering, decimation and so forth. The resulting processed signals are provided to a demodulator 330, which may demodulate the signals to obtain original message information. This original message information may include header information and data payload information. Such information may be provided to a data processor 340 which may consume the data payload.

In addition, data processor 340 may include a header processing circuit 345, which may be configured to extract various information from a header portion of a frame. In relevant aspect herein, this information may include a transmit power value and a noise floor value, which may be used in a ML model.

Still with reference to FIG. 3, note that the demodulated processed signals also may be provided to a signal detector 350, which in an embodiment may be implemented as an RSSI detector. Based on the signal strength, signal detector 350 may determine an RSSI signal level.

As illustrated, a controller 360 is coupled to receive various parameter information associated with incoming frames, including RSSI information, transmit power level and noise floor. As shown, controller 360 may include a ML model 365 as described herein. Based at least in part on the incoming parameter information, a control circuit 368 such as a processing circuit may execute ML model 365 to determine an appropriate transmit power level for a next frame to be communicated from device 300. As such, this power level may be provided as control information to a power amplifier 390 of a transmit signal processing path.

Still with reference to FIG. 3, assume that device 300 is a sensor device that includes at least one sensor 370. Sensor 370 may sense a given environmental condition and provide sensor information to a data processor 375, which may generate a frame for transmission that includes at least some of this sensor information. In some cases, data processors 340 and 375 may be a single processing unit.

In turn, the frame may be processed in a baseband circuit 380, converted into an analog form in a digital-to-analog converter (DAC) 382, and upconverted to an RF level in a mixer 385. The resulting RF signal is provided to PA 390, where it can be amplified to a desired transmit power level based on the control information provided from controller 360 so that PA 390 outputs the RF signal via antenna 305 at the desired transmit power level. Understand while shown at this high level in FIG. 3, many variations and alternatives are possible.

Figure 4:
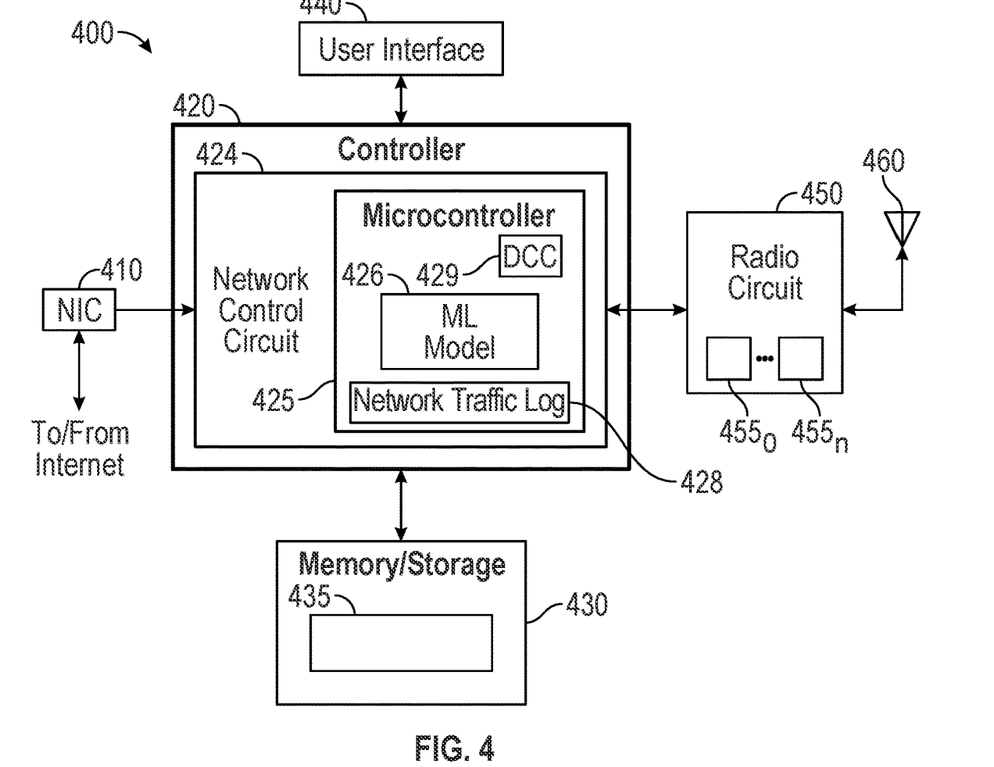
FIG. 4 is a block diagram of a universal gateway in accordance with an embodiment.

Referring now to FIG. 4, shown is a block diagram of a universal gateway in accordance with an embodiment. As shown in FIG. 4, gateway 400 is a computing device that acts as a network controller for a wireless network such as a given automation or control network. In addition, gateway 400 may act as an interface and/or router to enable communication with remote components, e.g., via the Internet. For example, gateway 400 may communicate with one or more cloud-based servers that may implement a rules-based engine for controlling one or more devices within the wireless network.

In the high level shown in FIG. 4, gateway 400 includes a network interface circuit (NIC) 410 that is an interface circuit to connect gateway 400 to remote systems. As examples, these systems may include cloud-based servers. In addition, one or more user interfaces may remotely connect to the wireless network via the Internet and NIC 410.

As further shown, NIC 410 couples to a controller 420. In an embodiment, controller 420 may be a microcontroller (MCU) that acts as a main processing circuit of gateway 400. In the high level shown in FIG. 4, controller 420 includes a network control circuit 424, which may control various operations within a wireless network. As shown, network control circuit 424 may include a microcontroller 425.

Microcontroller 425 may operate to monitor network traffic through the wireless network, as well as devices within the network, and further to update a ML model 426 that is used to dynamically determine TX power, both for gateway 400 and potentially for devices within the wireless network that have insufficient compute resources to execute this ML model. In turn, an updated ML mode may be pushed to network devices, e.g., when a lack of activity is detected.

As further shown, microcontroller 425 may include a data logging control circuit 429, which may be used to maintain a network traffic log 428. In embodiments herein, data logging control circuit 429 may obtain and store network traffic metadata including received power, transmit power and noise floor information. In an embodiment, network traffic log 428 may include multiple entries each associated with a communication within the wireless network. In turn, each of these entries may include the above-described network traffic metadata, along with other information.

Note that the implementation shown in FIG. 4 of a controller such as an MCU including internal network control circuitry, microcontroller circuitry, data logging control circuitry and network traffic log, is for example and identification purposes. Understand that in other cases, dedicated hardware circuitry may be present for these different control circuits. In still further cases, controller 420 or another MCU or other processor may execute instructions stored in a non-transitory storage medium. In an embodiment, these instructions may be implemented as a control program to perform the network configuration, ML model update and push described herein.

As further shown in FIG. 4, controller 420 also couples to a memory/storage 430, which may take the form of dynamic random access memory and one or more non-transitory storage media, such as a flash memory. Storage 430 may store an operating system, firmware and other programs such as at least one ML model as described herein. In an embodiment, a control program 435, also stored in non-transitory storage, may include program code that when executed by controller 420 performs network traffic metadata logging, ML model updates and pushes as described herein. Still with reference to FIG. 4, an optional user interface 440 may be present. The user interface may include a touchscreen display, to enable a user to view the status of various devices within the wireless network, as well as to provide user commands.

To enable communication with devices of different wireless communication protocols, a radio circuit 450 may include multiple protocol radio circuits $455_0$-$455_n$. The protocol radio circuits 455 may include physical layer and other radio circuitry each for a given wireless protocol. In turn, radio circuit 450 couples to an antenna 460 to provide wireless communication within a wireless network, including communication in accordance with a given Z-Wave communication protocol, currently available or available in the future such as a Z-Wave Long Range communication protocol. Understand while shown at this high level in the embodiment of FIG. 4, many variations and alternatives are possible.

Figure 5:
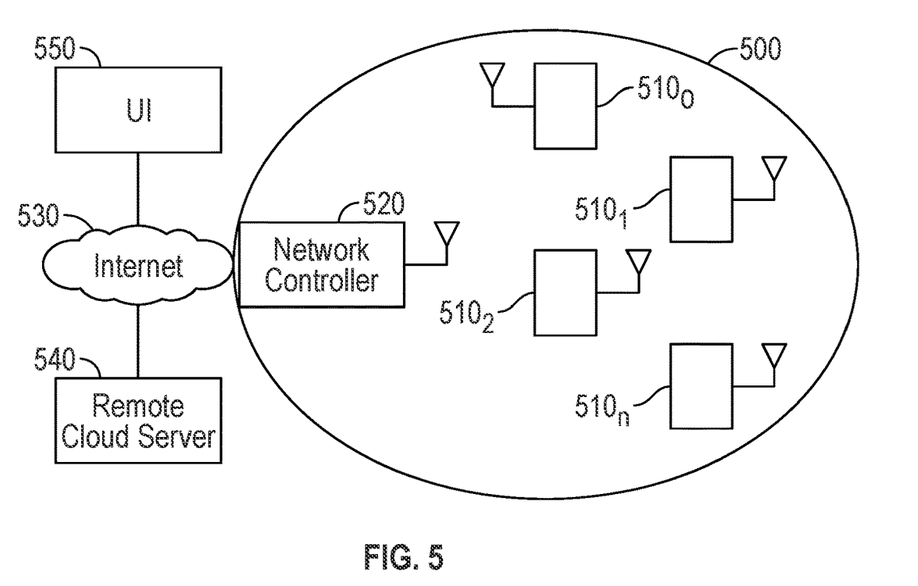
FIG. 5 is a block diagram of a representative wireless network in accordance with an embodiment.

Referring now to FIG. 5, shown is a block diagram of a representative wireless automation network in accordance with an embodiment. As shown in FIG. 5, network 500 may be implemented as a mesh network in which various nodes 510 ($510_{0-n}$) communicate with each other and also may communicate messages along from a particular source node to a given destination node. Such message-based communication also may be realized between various nodes 510 and a network controller 520. In an embodiment, network 500 may be implemented over a relatively large area, yet still provide for wireless local area network communication, such as according to a Z-Wave communication protocol that provides for long range communication, in a range of up to approximately 4 kilometers (km).

Understand while shown at a very high level in FIG. 5, network 500 may take many forms other than a mesh network. For example, in other cases a star network, a point-to-point network or other network topologies may be possible. Furthermore, while generic nodes 510 are shown for ease of illustration, understand that many different types of nodes may be present in a particular application. For example, in the context of a home automation system, nodes 510 may be of many different types. As examples, nodes 510 may include sensors, lighting components, door locks or other actuators, HVAC components, security components, window coverings, and possibly entertainment components, or other interface devices to enable control of such components via network 500. Of course in different implementations additional or different types of nodes may be present.

In addition, different nodes 510 may communicate according to different wireless communication protocols. As examples, representative communication protocols may include Bluetooth, Zigbee, Z-Wave, and Thread, among other possible wireless communication protocols. In some cases, certain nodes may be capable of communicating according to multiple communication protocols, while other nodes only may be capable of communicating by a given one of the protocols. Within network 500, certain nodes 510 may communicate with other nodes of the same communication protocol, either for providing direct message communication or for realizing mesh-based communications with network controller 520 or other components. In other instances, e.g., for certain Bluetooth devices, communications may be directly between a given node 510 and network controller 520.

As such in the embodiment of FIG. 5, network controller 520 may be implemented as a multi-protocol universal gateway. Details of representative gateway 400 of FIG. 4 are described above. Suffice to say, network controller 520 may be the primary controller within the network and may be configured to implement the network traffic metadata logging, ML model update and push techniques described herein. Furthermore, network controller 520 may perform operations to set up the network and enable communication between different nodes and update such set up as devices enter and leave network 500.

In addition, network controller 520 further may be an interface to interact with remote devices such as cloud-based devices. To this end, network controller 520 further may communicate, e.g., via the Internet with a remote cloud server 540. As also shown, one or more user interfaces 550 that can be used to interact with network 500 may be located remotely and may communicate with network controller 520 via the Internet 530. As examples, such user interfaces 550 may be implemented within a mobile device such as a smartphone, tablet computer or so forth of a user authorized to access network 500. For example, the user may be a homeowner of a home in which wireless network 500 is implemented as a home automation network. In other cases, the user may be an authorized employee such as an IT individual, a maintenance individual or so forth who uses remote user interface 550 to interact with network 500, e.g., in the context of a building automation network. Understand that many other types of automation networks, such as an industrial automation network, a smart city network, agricultural crop/livestock monitoring network, environmental monitoring network, store shelf label network, asset tracking network, or health monitoring network, among others also may leverage embodiments as described herein.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a transceiver comprising a receiver signal processing path and a transmitter signal processing path, the receiver signal processing path to receive and process a message; and
    a controller coupled to the transceiver to obtain information regarding the message and to determine, based at least in part on the information, a transmit power level for a next message to be sent from the transceiver according to a machine learning (ML) model.

2. The apparatus of claim 1, wherein the controller is to receive the ML model from a network controller of a wireless control network, the ML model determined in the network controller based at least in part on network traffic information of the wireless control network.

3. The apparatus of claim 2, wherein the controller is to replace an original ML model stored in the apparatus with the received ML model.

4. The apparatus of claim 1, further comprising a storage to store the ML model.

5. The apparatus of claim 1, further comprising a data processor to extract noise floor information and transmit power information from a header of the message, the information comprising the noise floor information and the transmit power information.

6. The apparatus of claim 5, further comprising a signal detector coupled to the receiver signal processing path to determine received power information based on the message, the information comprising the received power information.

7. The apparatus of claim 6, wherein the signal detector comprises a received signal of strength indicator (RSSI) detector and the received power information comprises an RSSI value.

8. The apparatus of claim 1, wherein the transmitter signal processing path comprises a power amplifier to amplify and output the next message via an antenna, wherein the controller is to configure the power amplifier based on the transmit power level.

9. The apparatus of claim 1, wherein the apparatus is to insert a value of the transmit power level into a header of the next message.

10. The apparatus of claim 9, wherein the apparatus is further to insert a value of noise floor information into the header of the next message.

11. At least one computer readable storage medium comprising instructions, which when performed by a network controller cause the network controller to:
- monitor, in the network controller, network traffic within a wireless control network;
- log network traffic metadata regarding the network traffic;
- perform machine learning (ML) using the logged network traffic metadata to update a ML model for use by transmitters within the wireless control network; and
- send the updated ML model to a plurality of nodes of the wireless control network, the plurality of nodes each including a transmitter.

12. The at least one computer readable storage medium of claim 11, further comprising instructions that when executed cause the network controller to configure the plurality of nodes of the wireless control network with a standard ML model, and thereafter monitor the network traffic and log the network traffic metadata.

13. The at least one computer readable storage medium of claim 12, further comprising instructions that when executed cause the network controller to extract the network traffic metadata from a plurality of messages communicated within the wireless control network, the network traffic metadata comprising, for each of the plurality of messages, a noise floor value and a transmit power value from each of the plurality of messages.

14. The at least one computer readable storage medium of claim 12, further comprising instructions that when executed cause the network controller to determine a received power value for each of the plurality of messages.

15. The at least one computer readable storage medium of claim 12, further comprising instructions that when executed cause the network controller to store the updated ML model in a non-volatile storage associated with the controller, the controller comprising a gateway of the wireless control network.

16. A wireless device comprising:
- a front end circuit to receive and downconvert a radio frequency (RF) signal to a baseband signal;
- a demodulator coupled to the front end circuit to demodulate the baseband signal to obtain a message;
- a data processor coupled to the demodulator to receive the message and extract transmit power information and noise floor information from a header of the message;
- a controller coupled to the data processor to receive the transmit power information and the noise floor information, and to determine based at least in part thereon using a machine learning (ML) model, a transmit power level for a next message to be sent from the wireless device; and
- a power amplifier to amplify and output the next message according to the transmit power level.

17. The wireless device of claim 16, wherein the controller is to receive the ML model from a network controller of a wireless control network, the ML model determined in the network controller based at least in part on network traffic information of the wireless control network.

18. The wireless device of claim 16, further comprising a signal detector to determine received power information based on the message.

19. The wireless device of claim 18, wherein the controller is to receive the received power information, and determine the transmit power level for the next message further based on the received power information.

20. The wireless device of claim 16, wherein the data processor is to insert a value of the transmit power level for the next message into a header of the next message.

* * * * *

UNITED STATES PATENT AND TRADEMARK OFFICE
CERTIFICATE OF CORRECTION

| | |
|---|---|
| PATENT NO. | : 11,375,463 B2 |
| APPLICATION NO. | : 17/106368 |
| DATED | : June 28, 2022 |
| INVENTOR(S) | : Shorty et al. |

It is certified that error appears in the above-identified patent and that said Letters Patent is hereby corrected as shown below:

In the Claims

Column 11:
Line 7, after "At least one" insert --non-transitory--;
Line 19, after "At least one" insert --non-transitory--;
Line 25, after "At least one" insert --non-transitory--;
Line 34, after "At least one" insert --non-transitory--;
Line 37, after "At least one" insert --non-transitory--.

Signed and Sealed this
Ninth Day of August, 2022

Katherine Kelly Vidal
*Director of the United States Patent and Trademark Office*